(12) United States Patent
Akieda et al.

(10) Patent No.: US 12,446,176 B2
(45) Date of Patent: Oct. 14, 2025

(54) ELECTRONIC DEVICE HOUSING

(71) Applicant: FCL Components Limited, Tokyo (JP)

(72) Inventors: Shinichiro Akieda, Tokyo (JP); Takuro Tanabe, Tokyo (JP); Tamotsu Koike, Tokyo (JP)

(73) Assignee: FCL Components Limited, Tokyo (JP)

( * ) Notice: Subject to any disclaimer, the term of this patent is extended or adjusted under 35 U.S.C. 154(b) by 225 days.

(21) Appl. No.: 18/350,436

(22) Filed: Jul. 11, 2023

(65) Prior Publication Data

US 2024/0040728 A1 Feb. 1, 2024

(30) Foreign Application Priority Data

Jul. 27, 2022 (JP) .................................. 2022-119912

(51) Int. Cl.
| | |
|---|---|
| *H05K 5/06* | (2006.01) |
| *F16J 15/10* | (2006.01) |
| *H04M 1/02* | (2006.01) |
| *H04M 1/18* | (2006.01) |

(52) U.S. Cl.
CPC ............. *H05K 5/061* (2013.01); *H05K 5/069* (2013.01); *F16J 15/104* (2013.01)

(58) Field of Classification Search
CPC .......... H05K 5/061; H05K 5/069; H05K 5/15; H05K 5/0221; H01M 1/0252
See application file for complete search history.

(56) References Cited

U.S. PATENT DOCUMENTS

| | | |
|---|---|---|
| 5,079,559 A | 1/1992 | Umetsu et al. |
| 9,728,865 B1 | 8/2017 | Voli |
| 2004/0157483 A1 | 8/2004 | Karasik et al. |
| 2006/0030194 A1* | 2/2006 | Goetz .................. G09F 3/0323 439/367 |
| 2009/0017778 A1 | 1/2009 | Akieda |

(Continued)

FOREIGN PATENT DOCUMENTS

| | | |
|---|---|---|
| CA | 2845703 C | 4/2020 |
| JP | H06-15364 U | 2/1994 |

(Continued)

OTHER PUBLICATIONS

U.S. Appl. No. 18/350,368, filed Jul. 11, 2023, naming inventors Akieda et al.

(Continued)

*Primary Examiner* — Timothy J Thompson
*Assistant Examiner* — Amol H Patel
(74) *Attorney, Agent, or Firm* — Shumaker & Sieffert, P.A.

(57) ABSTRACT

A housing for housing an electronic device according to an aspect of the present disclosure includes an upper case and a lower case which are formed so as to mate with each other, a gasket arranged between the upper case and the lower case, an elastically deformable cantilever which is formed on one of the upper case and the lower case and which has a hook, and an engagement portion formed on the other of the upper case and the lower case, wherein when an operation to mate the upper case and the lower case is performed, before the cantilever is completely engaged with the engagement portion, a gap between the upper case and the lower case is sealed by the gasket.

7 Claims, 20 Drawing Sheets

(56) References Cited

U.S. PATENT DOCUMENTS

| | | | | |
|---|---|---|---|---|
| 2012/0118773 A1* | 5/2012 | Rayner | ............. | H05K 5/15 |
| | | | | 206/320 |
| 2012/0314354 A1* | 12/2012 | Rayner | ............. | G06F 1/1633 |
| | | | | 361/679.01 |
| 2013/0088130 A1 | 4/2013 | Rayner | | |
| 2013/0146323 A1* | 6/2013 | Yamaguchi | ............. | F16J 15/062 |
| | | | | 174/50 |
| 2014/0021025 A1 | 1/2014 | Sersch | | |
| 2015/0296636 A1* | 10/2015 | Wang | ............. | H05K 5/061 |
| | | | | 361/736 |

FOREIGN PATENT DOCUMENTS

| | | |
|---|---|---|
| JP | H10208717 A | 8/1998 |
| JP | 2002-61618 A | 2/2002 |
| JP | 2009-21936 A | 1/2009 |
| KR | 101435081 B1 | 8/2014 |

OTHER PUBLICATIONS

Extended Search Report from counterpart European Application No. 23187539.4 dated Jan. 5, 2024, 8 pp.

* cited by examiner

FIG. 2
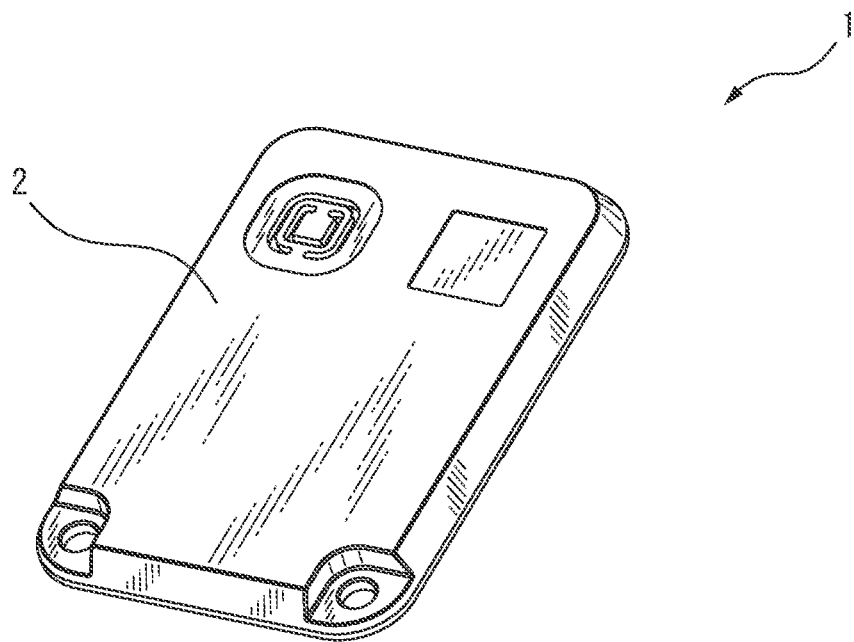
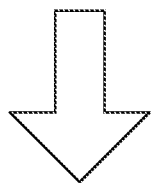
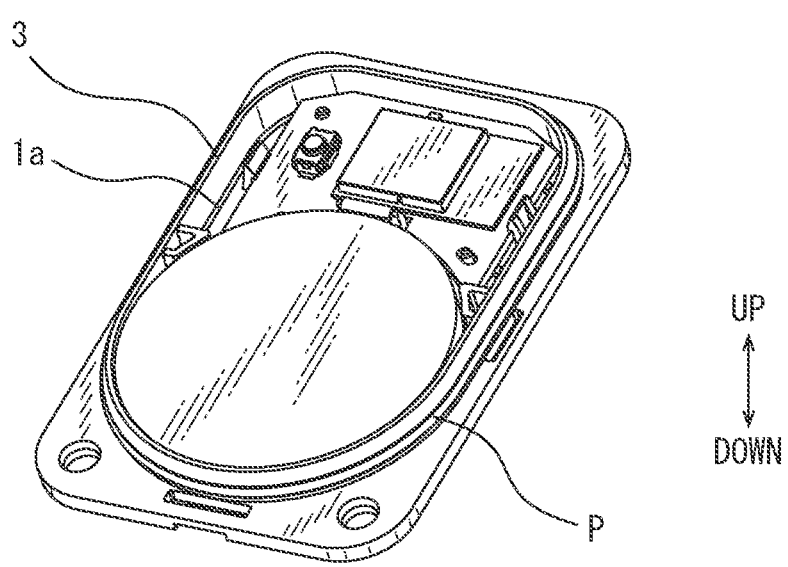

ELECTRONIC DEVICE HOUSING

CROSS-REFERENCE TO RELATED APPLICATION

This application is based upon and claims the benefit of priority of the prior Japanese Patent Applications No. 2022-119912 filed on Jul. 27, 2022, the entire contents of which are incorporated herein by reference.

TECHNICAL FIELD

A certain aspect of the embodiments is related to a housing for accommodating an electronic device such as wireless devices.

BACKGROUND

Various types of housings for housing electronic devices including sensors and wireless devices are used depending on application. For example, there is known the housing of a telephone, which is composed of an upper case and a lower case, wherein a waterproof structure is formed by forming a mating groove around the entire circumference of an opening end surface of one of the cases, a gasket is mated in this mating groove, and both cases are mated so that the respective opening end surfaces thereof are aligned.

There is known a case having a configuration in which a top cover, on which there is formed an arm portion having a hook, is mounted onto a body case having an engagement portion which engages with the hook, to lock the top cover to the body case. There is known a case for housing a transmitting/receiving device, which is composed of an upper half case and a lower half case, and which is configured such that a button battery, which is housed in a corner portion of the lower half case, is held between the lower case and a terminal member secured to a circuit board by an elastic biasing force of the terminal member.

CITATION LIST

Patent Literature

PTL 1: Japanese Unexamined Utility Model Publication No. 6-15364U
PTL 2: Japanese Unexamined Patent Publication (Kokai) No. 2002-61618A
PTL 3: Japanese Unexamined Patent Publication (Kokai) No. 2009-21936A

SUMMARY

When designing a housing comprising an upper case and a lower case as described above so as to have a waterproof structure, it is common to provide a rubber gasket between the upper case and the lower case. At this time, it becomes necessary to precisely control how much pressure should be applied between the upper case and the lower case. For example, when adopting a structure in which an upper case and a lower case are screwed together, a special tool is required to manage the screwing torque. When adopting a structure in which an upper case is press-fitted into a lower case, there is a risk that the waterproof function will not be stably maintained as a result of a difference in the amount of press-fitting. Furthermore, an affixation method by press-fitting and rotating may not yield a stable waterproof function, depending on the amount of rotation. Thus, it is necessary to appropriately control the amount of press-fitting and the amount of rotation, and if there are individual differences among users, a waterproof function may not be achieved. In an embodiment, there is provided an electronic device housing in which a housing having an upper case and a lower case can easily be assembled such that a waterproof function is completely achieved.

One aspect of the present disclosure provides a housing for housing an electronic device, the housing comprising an upper case and a lower case which are formed so as to mate with each other, a gasket arranged between the upper case and the lower case, an elastically deformable cantilever, having a hook, which is formed on one of the upper case and the lower case, and an engagement portion formed on the other of the upper case and the lower case, wherein when an operation to mate the upper case and the lower case is performed, before the cantilever is completely engaged with the engagement portion, a gap between the upper case and the lower case is sealed by the gasket.

BRIEF DESCRIPTION OF DRAWINGS

FIG. 2 is an exploded view of a housing.

DESCRIPTION OF EMBODIMENTS

Hereinafter, a description will be given of the embodiment of the present invention with reference to the drawings.

Next, the embodiments of the present disclosure will be described with reference to the attached drawings. In the referenced drawings, identical constituent portions or functional portions have been assigned the same reference sign. In order to facilitate understanding, the scales of the drawings have been appropriately changed. Furthermore, the illustrated aspects are merely one example for carrying out the present invention, and the present invention is not limited to the illustrated aspects.

Figure 1A:
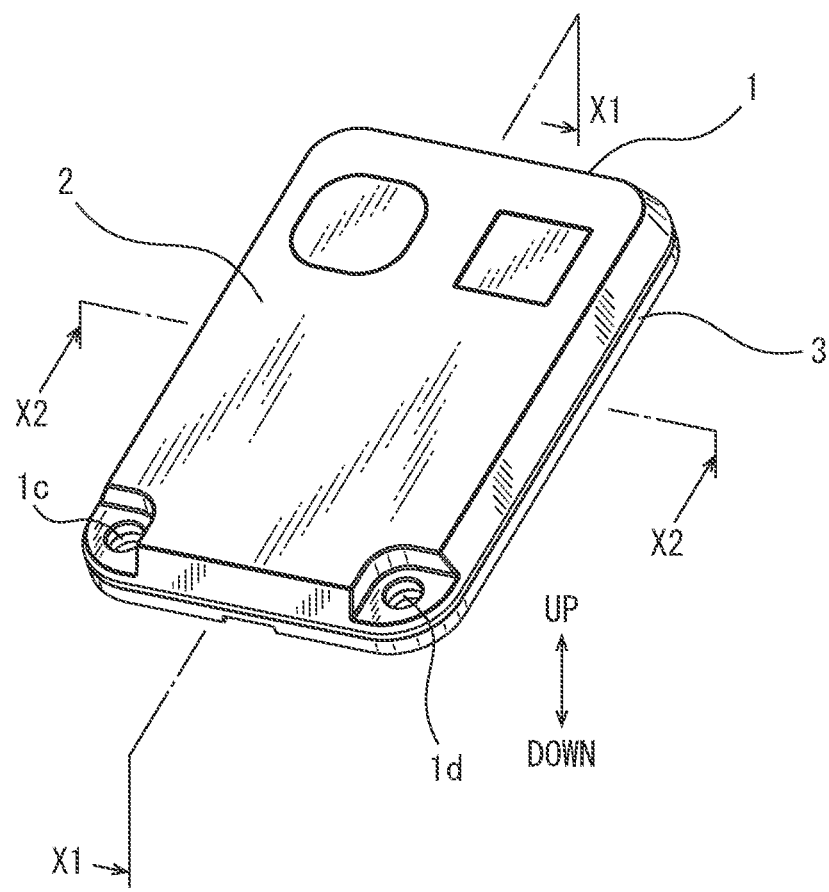
FIG. 1A is a perspective view of a housing as viewed from above according to an embodiment.
Figure 1B:
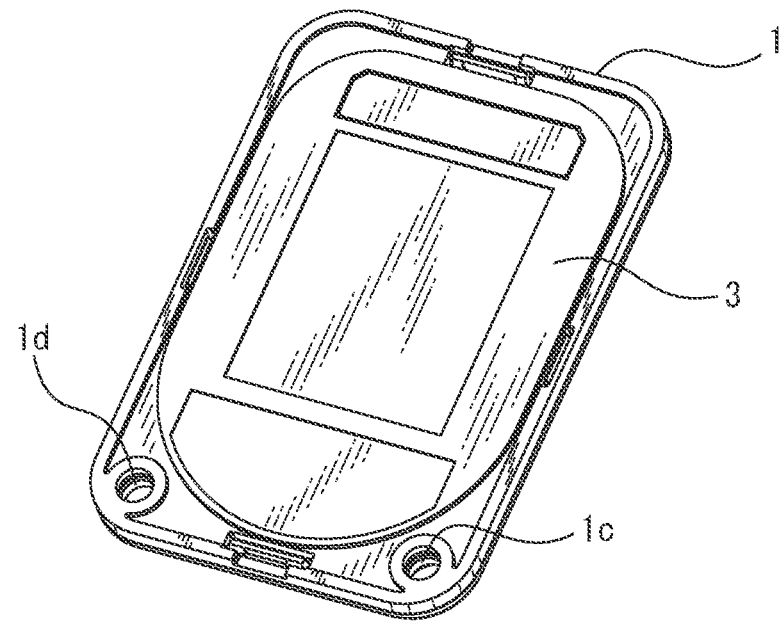
FIG. 1B is a perspective view of a housing as viewed from below.

A housing 1 of an electronic product according to an embodiment will be described below. The housing 1 houses an electronic device 100 (for example, a wireless device comprising a sensor) in the interior space thereof (refer to FIG. 14). The housing 1 in which the electronic device 100 is housed can be used as an electronic product for various purposes. FIG. 1A is a perspective view of the housing 1 as viewed from above, and FIG. 1B is a perspective view of the housing 1 as viewed from below. As shown in FIGS. 1A and 1B, the housing 1 has an upper case 2 and a lower case 3. Each of the upper case 2 and the lower case 3 is, for example, a resin molded product. FIG. 2 is an exploded perspective view of the housing 1 as viewed from above. As shown in FIG. 2, the upper case 2 can be assembled and combined with the lower case 3 from above. The housing 1 also has a waterproof function. As shown in FIG. 2, the interior space 1a of the housing 1 is maintained in a watertight state when the upper case 2 is combined with the lower case 3. For convenience of explanation, as shown in FIGS. 1A and 2, the side where the lower case 3 is arranged is defined as the lower side, and the side where the upper case 2 is arranged is defined as the upper side.

As shown in FIGS. 1A, 1B and 2, the housing 1 has a substantially rectangular shape when viewed from above and has a thin shape. An electronic device such as a wireless device driven by a button battery can suitably be mounted in the interior space 1a of the housing 1.

Figure 3A:
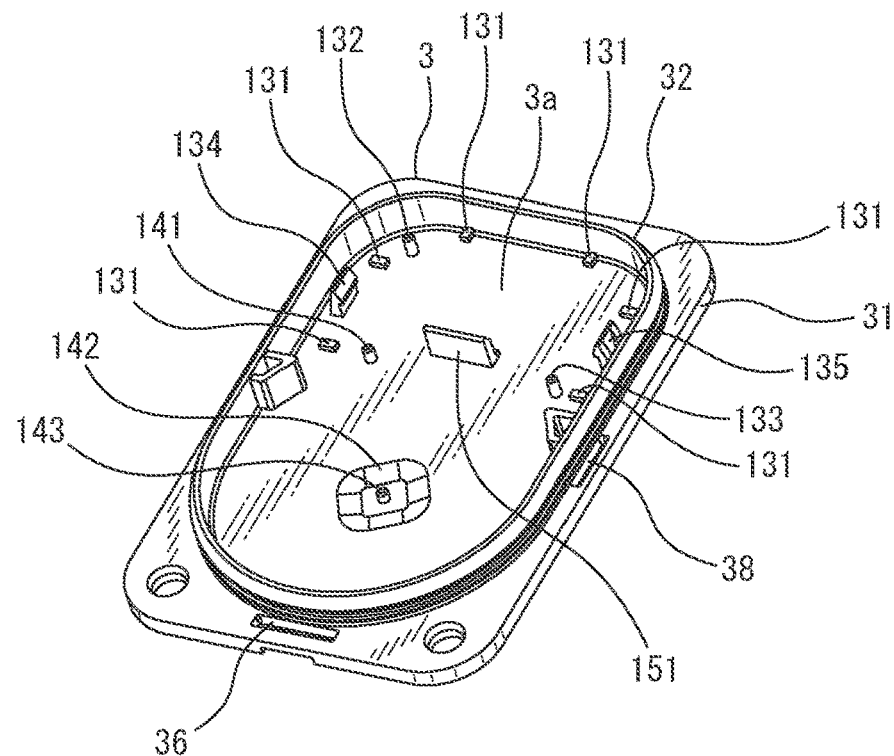
FIG. 3A is a perspective view of a lower case as viewed from above.
Figure 3B:
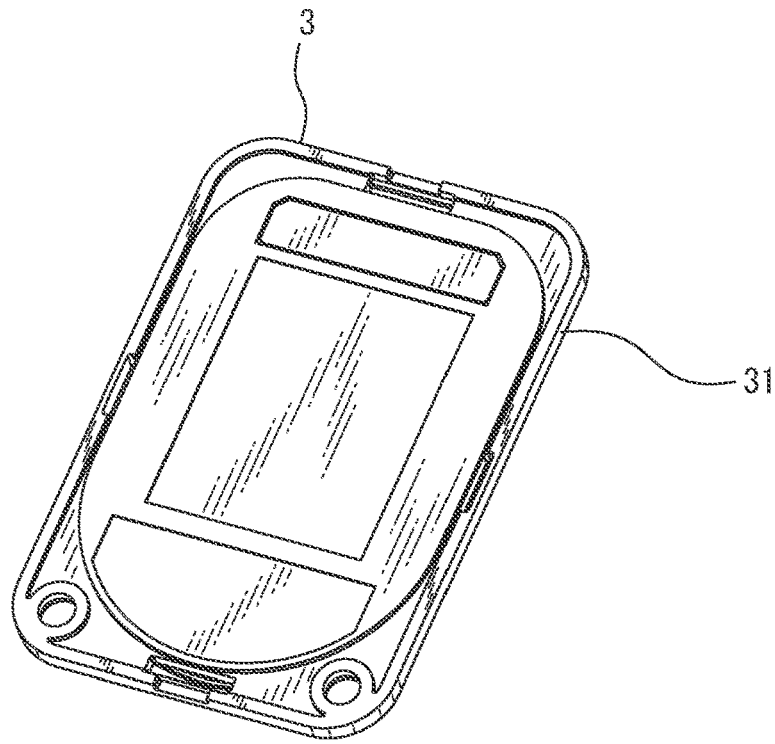
FIG. 3B is a perspective view of a lower case as viewed from below.

FIG. 3A shows a perspective view of the lower case 3 as viewed from above. FIG. 3A shows the structure of an inner bottom surface 3a of the lower case 3. FIG. 3B shows a perspective view of the lower case 3 as viewed from below (i.e., a perspective view of the lower surface of the lower case 3). FIGS. 4A, 4B, 4C, and 4D show a top view, a front view as viewed from the direction of arrow A1, a side view as viewed from the direction of arrow A2, and a bottom view of the lower case 3, respectively. The lower case 3 has a substantially rectangular outer shape when viewed from above. The lower case 3 has a bottom plate 31 having a substantially rectangular shape in top view, and has a lower peripheral wall 32 formed to be upright from the upper surface of the bottom plate 31 so as to define the interior space 1a of the housing 1 at a position more inside than the outer edge of the bottom plate 31.

Figure 4A:
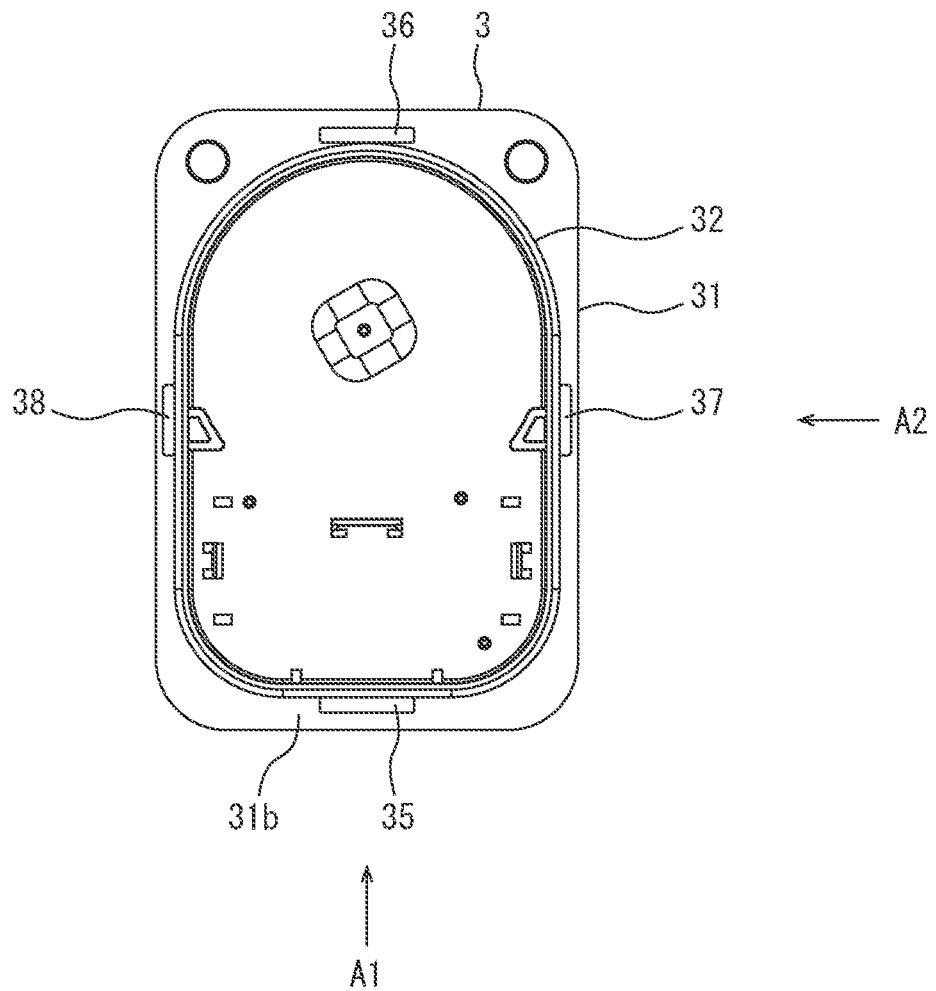
FIG. 4A is a top view of a lower case.
Figure 4B:
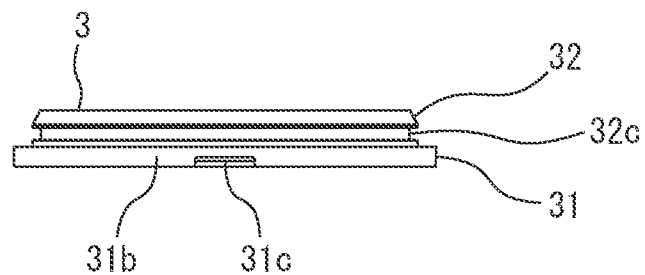
FIG. 4B is a front view of a lower case.
Figure 4C:
FIG. 4C is a side view of a lower case.
Figure 4D:
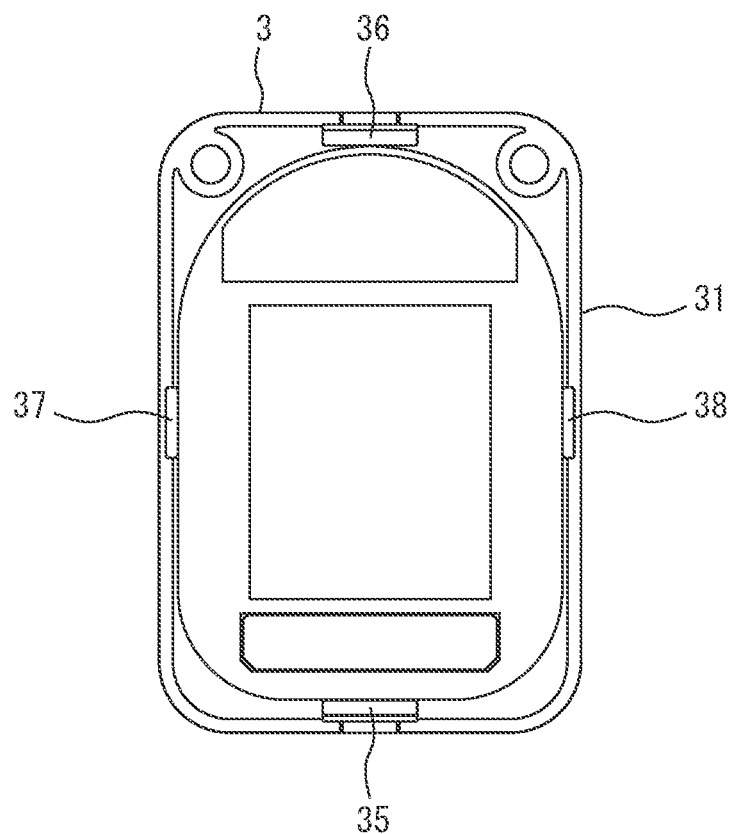
FIG. 4D shows a bottom view of a lower case.
Figure 7:
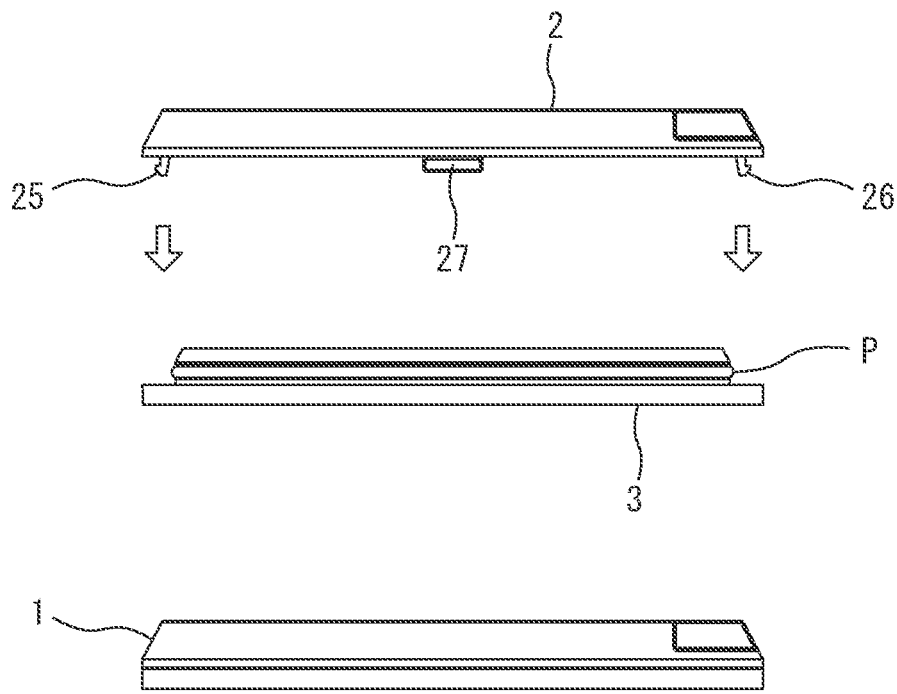
FIG. 7 is a side view showing attachment of an upper case to a lower case.

As shown in the front view of FIG. 4B and the side view of FIG. 4C, a groove 32c for mounting of a waterproof gasket (O-ring) P is formed in the outer peripheral surface of the lower peripheral wall 32 (refer to FIG. 7).

Figure 5A:
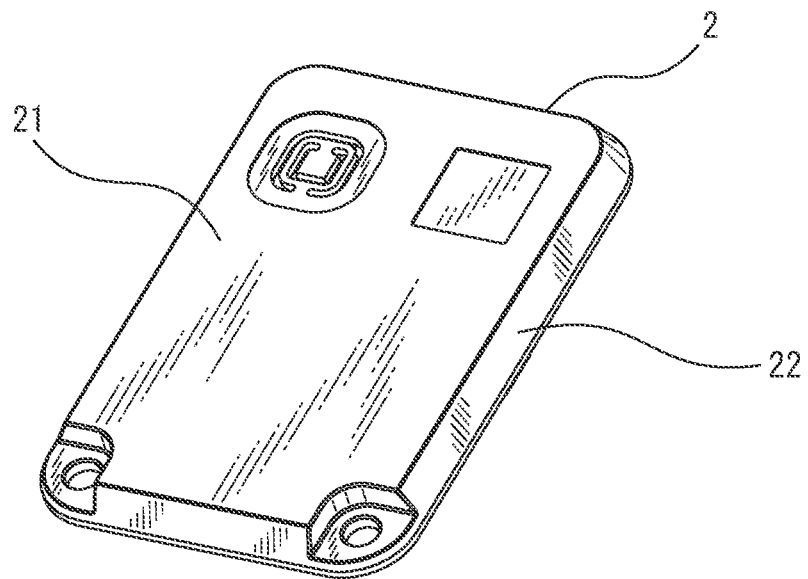
FIG. 5A is a perspective view of an upper case as viewed from above.
Figure 5B:
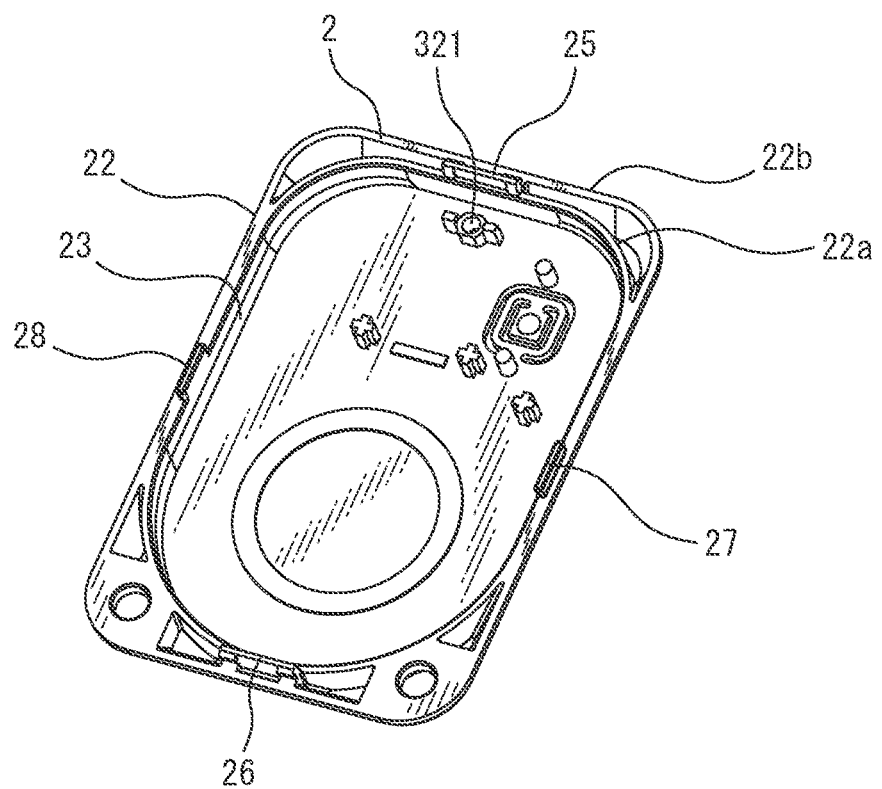
FIG. 5B is a perspective view of an upper case as viewed from below.

FIG. 5A shows a perspective view of the upper case 2 as viewed from above. FIG. 5B shows a perspective view of the upper case 2 as viewed from below (i.e., a perspective view of the inner surface side of the upper case 2). FIGS. 6A, 6B, 6C, and 6D show a top view, a front view as viewed from the direction of arrow A3, a side view as viewed from the direction of arrow A4, and a bottom view of the upper case 2, respectively. The upper case 2 has an upper plate portion 21 and an upper peripheral wall 22 formed so as to extend downward from the outer edge of the upper plate portion 21 while slightly expanding in outer diameter.

As shown in FIG. 5B, inside the upper case 2, the upper peripheral wall 22 has an inner peripheral surface 23 facing the interior space 1a. The upper peripheral wall 22 has a first peripheral wall portion 22a forming the inner peripheral surface 23 and a second peripheral wall portion 22b that forms the outer surface of the upper case 2 at the end of the upper case 2 on the inner side in FIG. 5B. In a state in which the upper case 2 is attached to the lower case 3, the inner peripheral surface 23 of the upper peripheral wall 22 is formed at a position adjacent to the outer surface of the lower peripheral wall 32 of the lower case 3 (refer to, for example, FIG. 9).

Figure 6A:
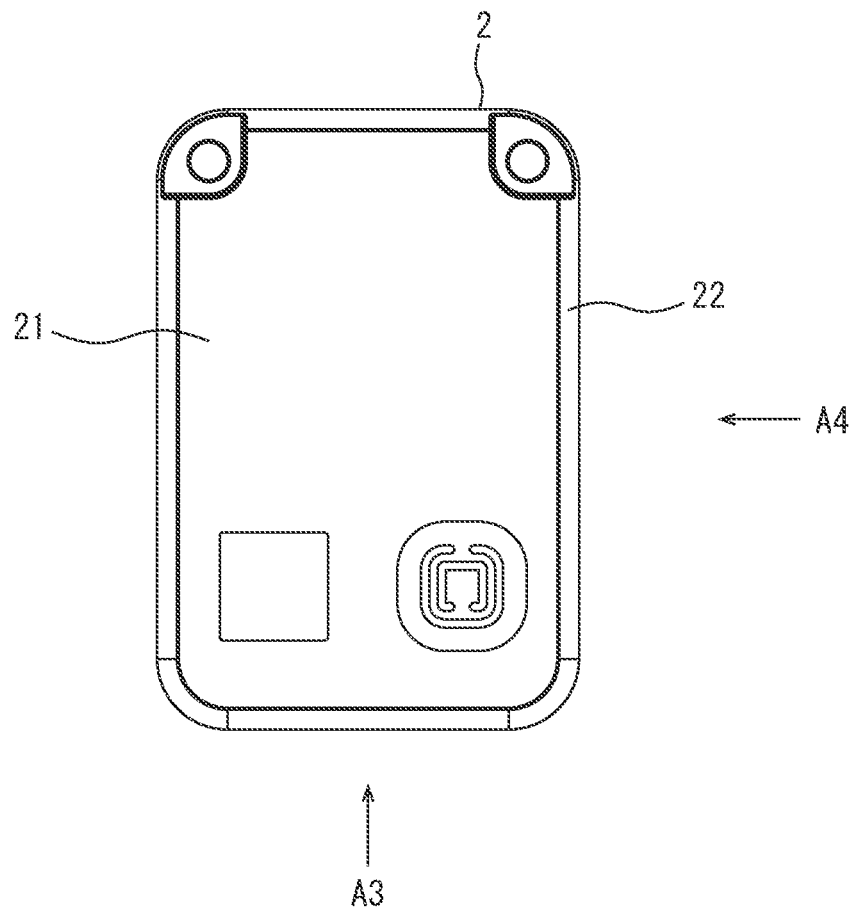
FIG. 6A is a top view of an upper case.
Figure 6B:
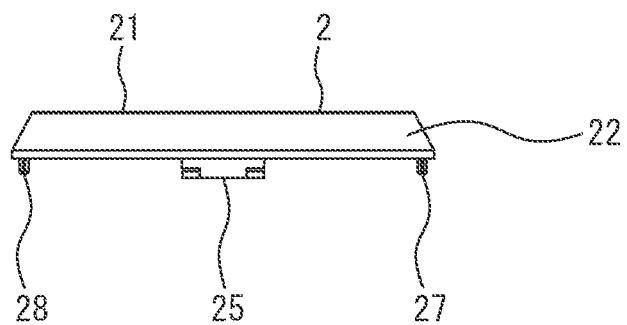
FIG. 6B is the front view of an upper case.
Figure 6C:
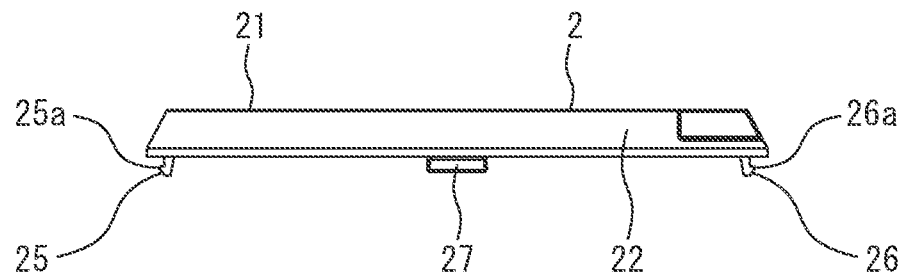
FIG. 6C is a side view of an upper case.
Figure 6D:
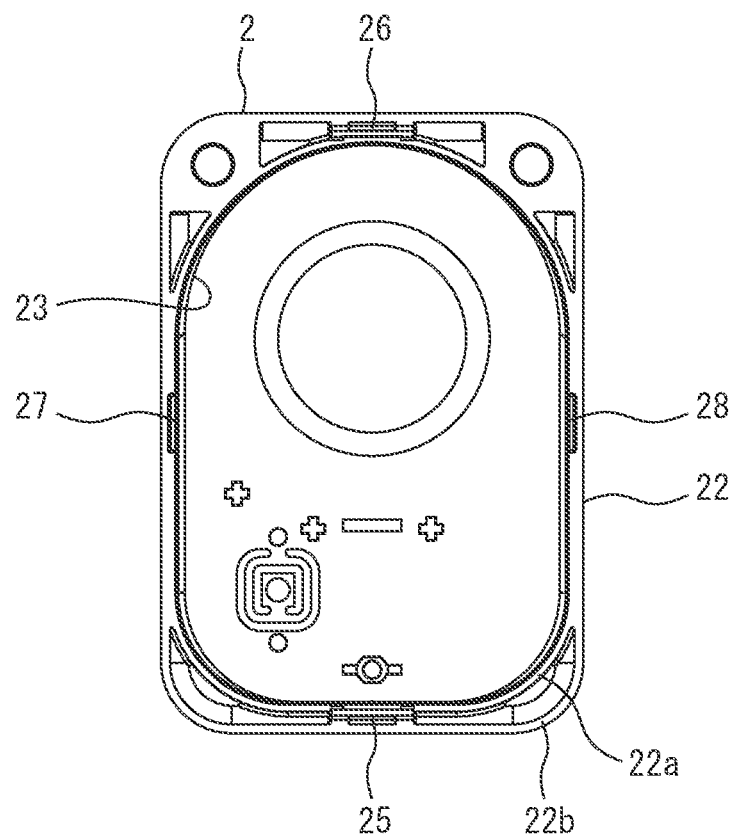
FIG. 6D shows a bottom view of an upper case.

On the bottom side of the upper case 2 as shown in FIGS. 5B and 6D, downwardly-protruding elastically-deformable cantilevers 25, 26, 27, 28 are formed near the center of each of the four sides defining the outer edge. These cantilevers 25 to 28 are formed in positions to engage with four engaging holes 35, 36, 37, 38 (refer to FIGS. 3A, 4A and 4D) formed in the four side portions defining the outer shape of the lower case 3. Among these cantilevers 25 to 28, the cantilevers 25 and 26 formed on two side portions facing each other in the front-rear direction have hooks 25a and 26a (refer to FIGS. 6C and 8) on the outer surfaces of their tip portions. By mating the upper case 2 to the lower case 3, the hook 25a (26a) engages with the engaging hole 35 (36), forming a state in which the upper case 2 is locked to the lower case 3. Specifically, the housing 1 employs a snap-fit structure as the structure for assembling the upper case 2 with the lower case 3.

Figure 8:
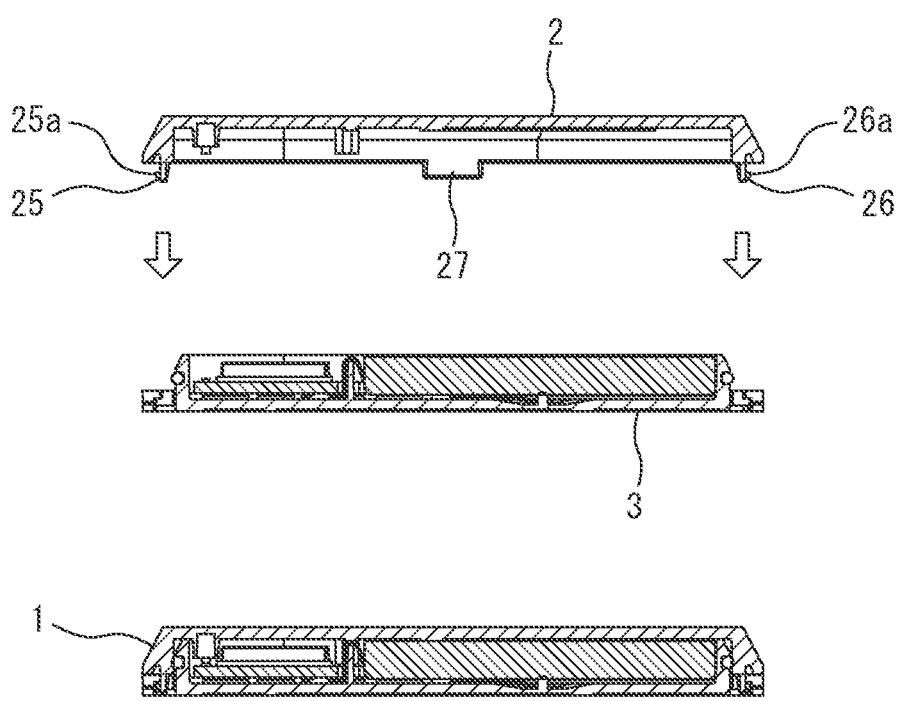
FIG. 8 is a cross-sectional view showing attachment of an upper case to a lower case.

FIGS. 7 and 8 are views detailing attachment of the upper case 2 to the lower case 3. FIG. 7 shows the attachment of the upper case 2 to the lower case 3 by means of a side view, and FIG. 8 shows the attachment of the upper case 2 to the lower case 3 by means of a cross-sectional view. Note that the cross-sectional view of FIG. 8 corresponds to the cross-sectional view of arrow X1-X1 in FIG. 1A. As shown in FIGS. 7 and 8, the upper case 2 is attached to the lower case 3 by pressing from above. At this time, the hooks 25a, 26a of the cantilevers 25, 26 engage with the engaging holes 35, 36, whereby the upper case 2 is locked to the lower case 3.

Figure 9:
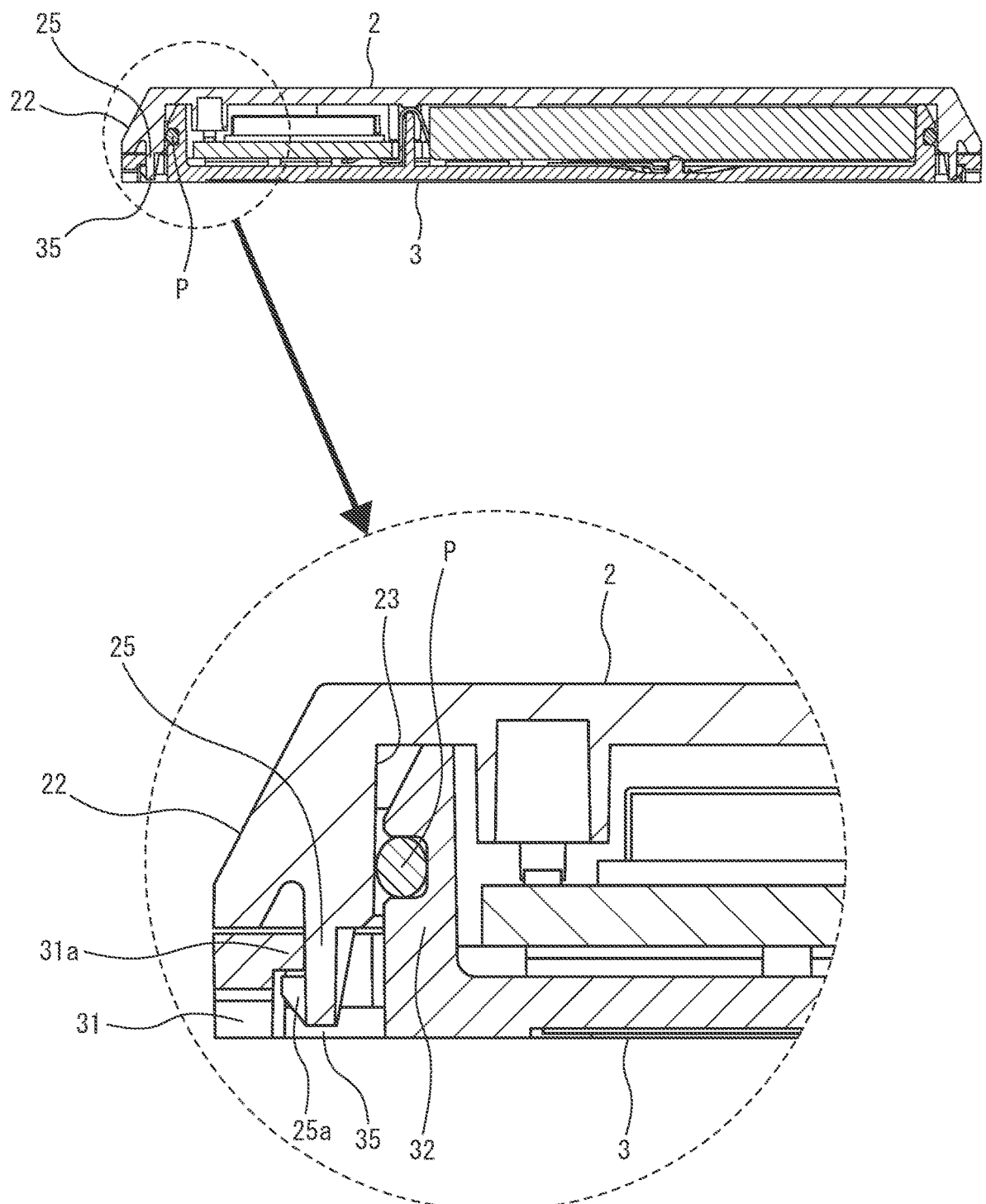
FIG. 9 shows a cross-sectional view of a state in which an upper case is attached to a lower case.

FIG. 9 shows again the cross-sectional view of the state in which the upper case 2 is attached to the lower case 3 (the cross-sectional view in the arrow X1-X1 direction of FIG. 1A), and an enlarged cross-sectional view near the cantilever 25 and the engaging hole 35. As shown in FIG. 9, the engagement hole 35 is formed such that the size of the inlet portion thereof is small in the cross-sectional view of FIG. 9 and widens toward the far side. Due to this structure, when attaching the upper case 2 to the lower case 3 from above, first, the hook 25a of the cantilever 25 comes into contact with the projecting portion 31a defining the outer edge of the inlet opening of the engaging hole 35, and the tip of the cantilever 25 is elastically deformed inward. By pushing the upper case 2 further into the lower case 3, the hook 25a passes over the projecting portion 31a and engages with the engagement hole 35. Through this series of operations, the user can perceive from a click feeling that the upper case 2 has completely combined with the lower case 3. In a state in which the upper case 2 and the lower case 3 are assembled, as shown in FIG. 9, the inner peripheral surface 23 of the upper peripheral wall 22 of the upper case 2 comes close to the outer surface of the lower peripheral wall 32 of the lower case 3, and compresses the gasket with the outer surface of the lower peripheral wall 32. As a result, the interior space 1a of the housing 1 is maintained in a watertight state.

Figure 10:
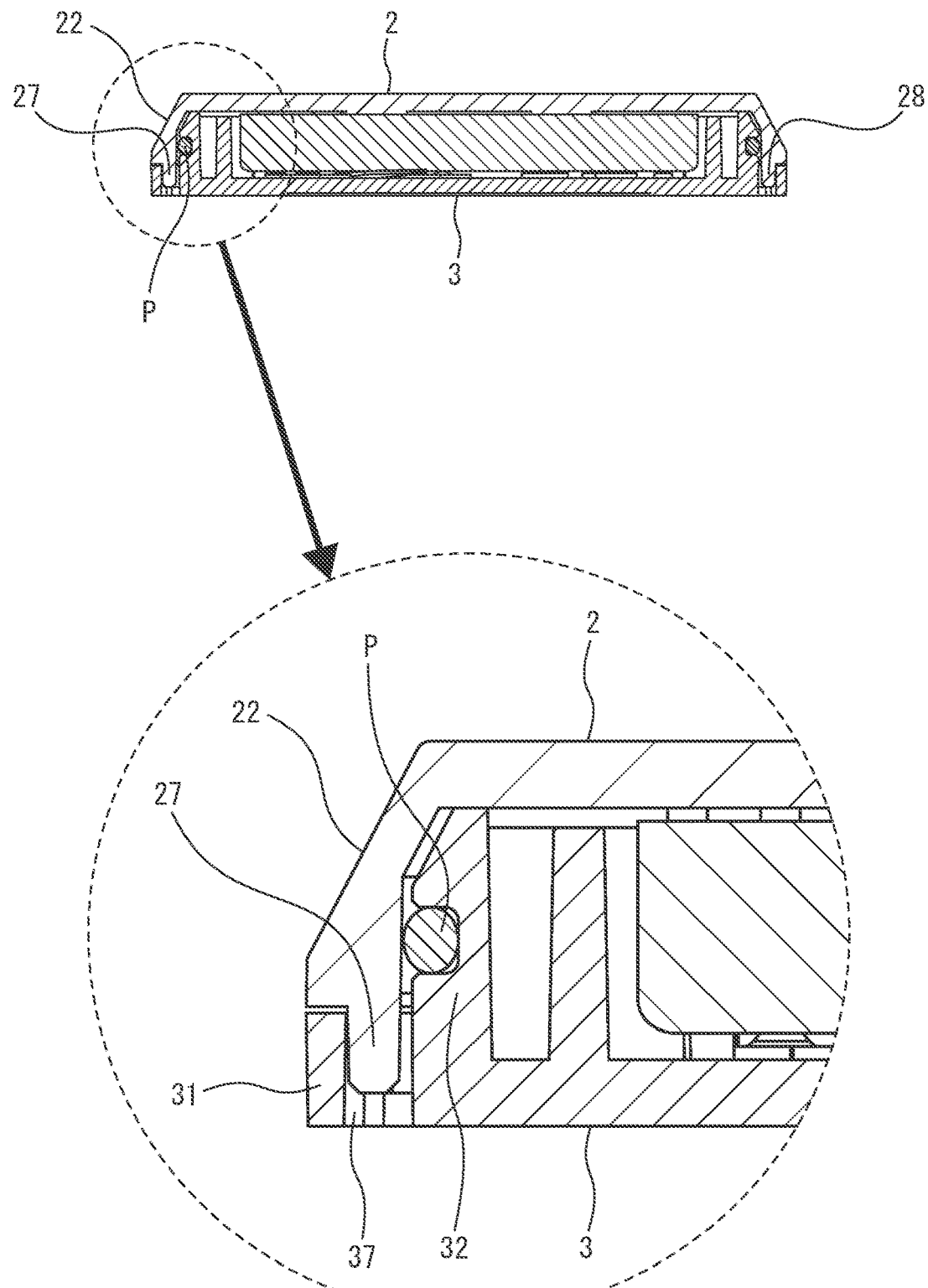
FIG. 10 shows a cross-sectional view of a state in which an upper case is attached to a lower case.

FIG. 10 shows a cross-sectional view of the state in which the upper case 2 is assembled with the lower case 3 (a cross-sectional view in the arrow X2-X2 direction of FIG. 1A), and an enlarged cross-sectional view near the cantilever 27 and the engagement hole 37. As shown in FIG. 10, the cantilever 27 fits into the engagement hole 37 when attaching the upper case 2 to the lower case 3 from above. As shown in FIG. 10, in a state in which the upper case 2 and the lower case 3 are combined, the outer peripheral surface of the cantilever 27 is in contact with the outer inner peripheral surface of the engagement hole 37, and the inner surface of the upper peripheral wall 22 of the upper case 2 is in close proximity to the outer surface of the lower peripheral wall 32 of the lower case 3, whereby the gasket P is compressed between it and the outer surface of the lower peripheral wall 32. As a result, the gasket P is compressed across the entire area between the upper peripheral wall 22 and the lower peripheral wall 32, achieving a waterproof function.

As described above, the interior space of the housing 1 is maintained in a watertight state when the upper case 2 is combined with the lower case 3. As shown in the enlarged cross-sectional view of FIG. 9, when the upper case 2 is attached to the lower case 3, the tip of the inner peripheral surface 23 of the upper peripheral wall 22 of the upper case 2 is positioned below the lowermost part of the gasket P when the hook 25a of the cantilever 25 passes over the protrusion 31a on the lower case 3 side. Specifically, when the upper case 2 is assembled with the lower case 3, the watertight state of the interior space 1a has already been achieved. In other words, when an operation to mate the upper case 2 and the lower case 3 is performed, before the cantilevers 25, 26 (hooks 25a, 26a) are completely engaged with the engaging holes 35, 36, the gasket P is arranged in a position to seal the gap between the upper case 2 and the lower case 3. Thus, when the user perceives that the upper case 2 is completely attached to the lower case 3 by a click feeling, the waterproof function has already been achieved. Such a configuration of the present embodiment makes it possible for the user to easily perceive that the housing 1 has been easily assembled in a state in which the waterproof function is completely achieved. Thus, it becomes unnecessary to separately prepare means for controlling how much pressure should be applied between the upper case 2 and the lower case 3. Therefore, a situation in which the waterproof function is not achieved due to the difference in pressure can be prevented.

Note that in the configuration according to the present embodiment, the snap-fit structure and the waterproof function are realized in separate and independent locations. For this reason, for example, the configuration eliminates the need to strongly design the hooks for the waterproof function.

Figure 11:
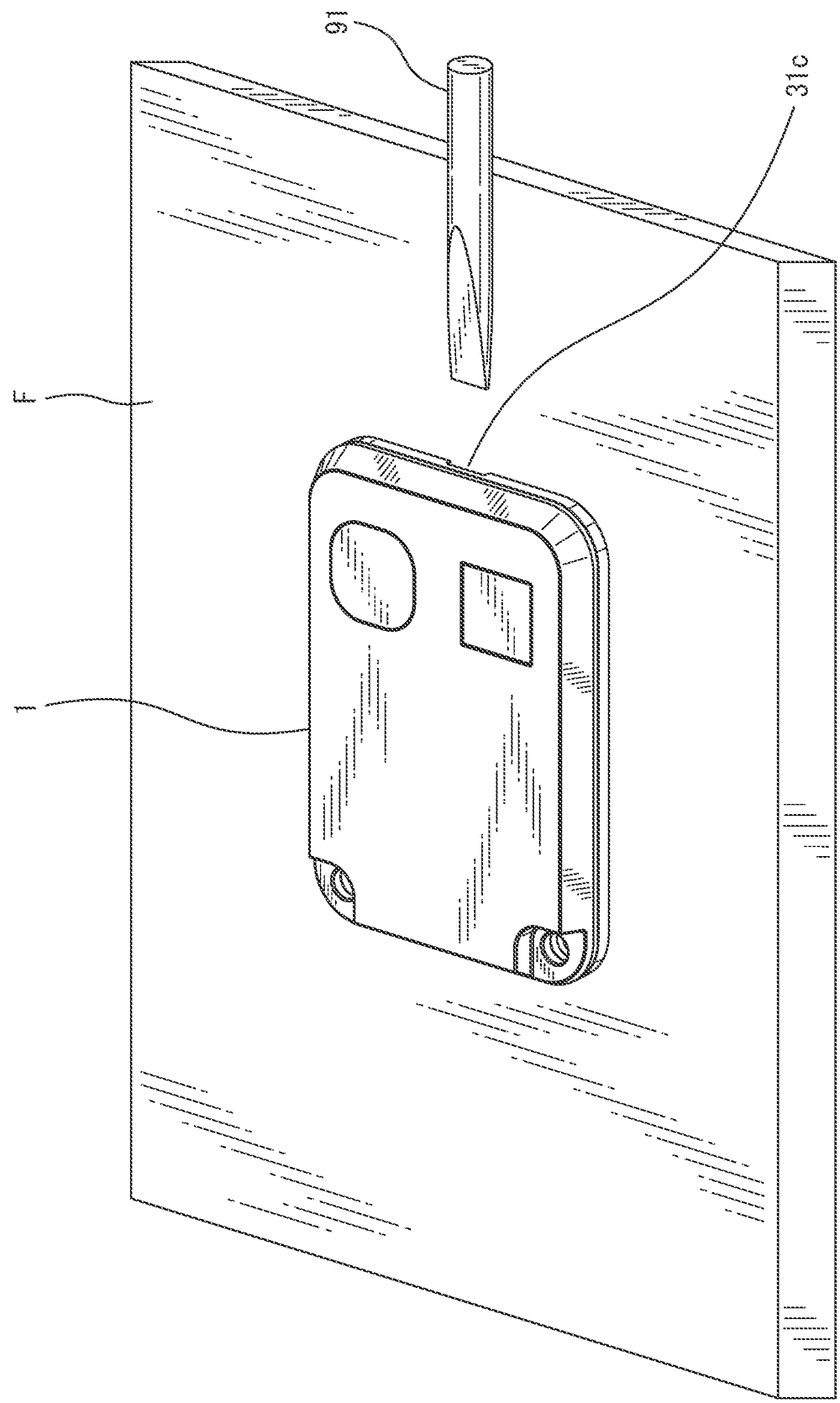
FIG. 11 is a view detailing removal of an upper case from a lower case using a tool.

As shown in the enlarged cross-sectional view of FIG. 9, the positions of the cantilevers 25, 26 are determined so that they engage with the engagement holes 35, 36 at positions recessed inward from the outermost surface defining the housing 1. Specifically, the cantilevers 25, 26 (hooks 25a, 26a) are hidden by the upper case 2. Thus, it is possible to prevent the user from directly touching the hooks 25a, 26a with their fingers from above and from the sides of the housing 1. As shown in FIG. 11, when the housing 1 is attached to an installation surface F on a flat plate, the upper case 2 cannot be removed by a simple operation. As a result, the upper case 2 is prevented from being easily detached by a simple operation, ensuring safety.

Figure 12:
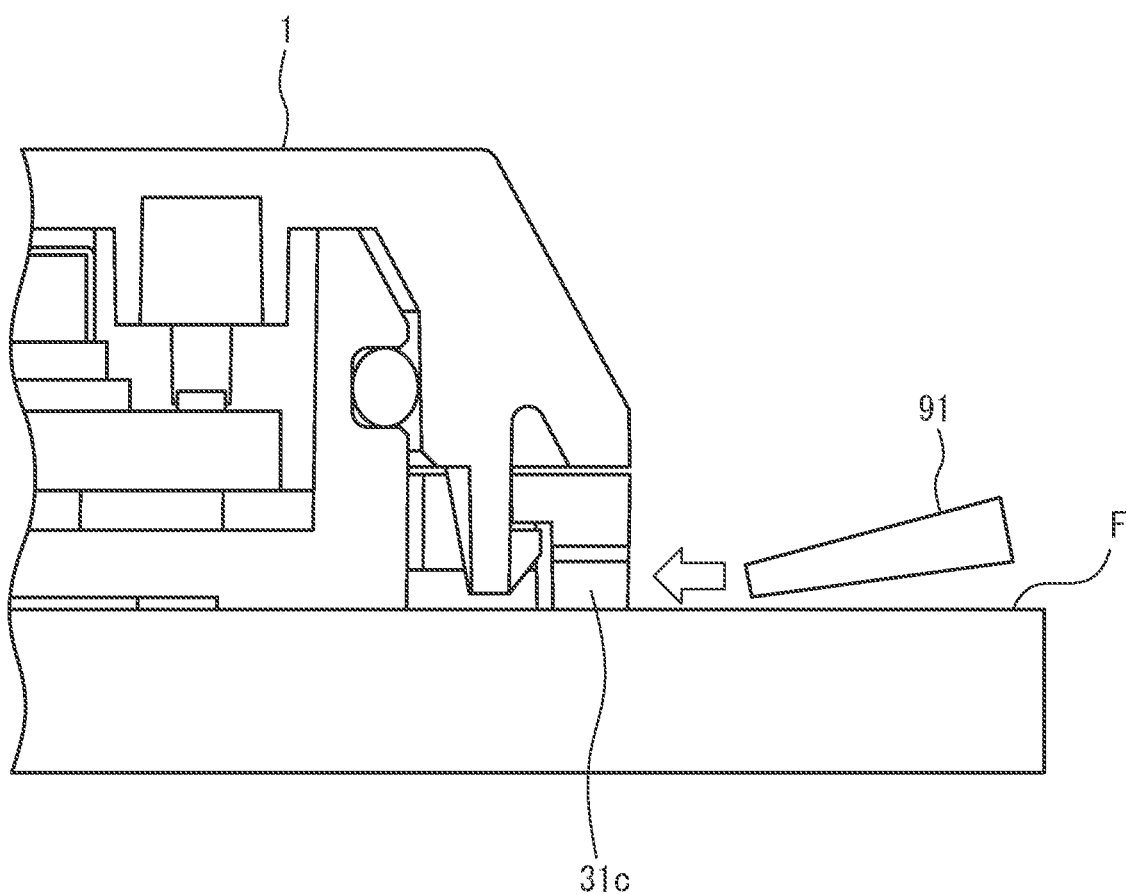
FIG. 12 is a view detailing removal of an upper case from a lower case using a tool.

A notch 31c having a specific width is formed at a portion of a rim portion 31b of the lower case 3 where the engagement hole 35 is located (refer to FIG. 4B). As shown in FIGS. 11 and 12, by sliding the tip of a flathead screwdriver 91 having a specific width into the notch 31c, the hook 25a is pushed inward, whereby the engagement state between the hook 25a and the engagement hole 35 can be released and the upper case 2 can be removed. Note that the width of the notch 31c may be set to a width such that only a specific flathead screwdriver can pass therethrough.

Figure 13:
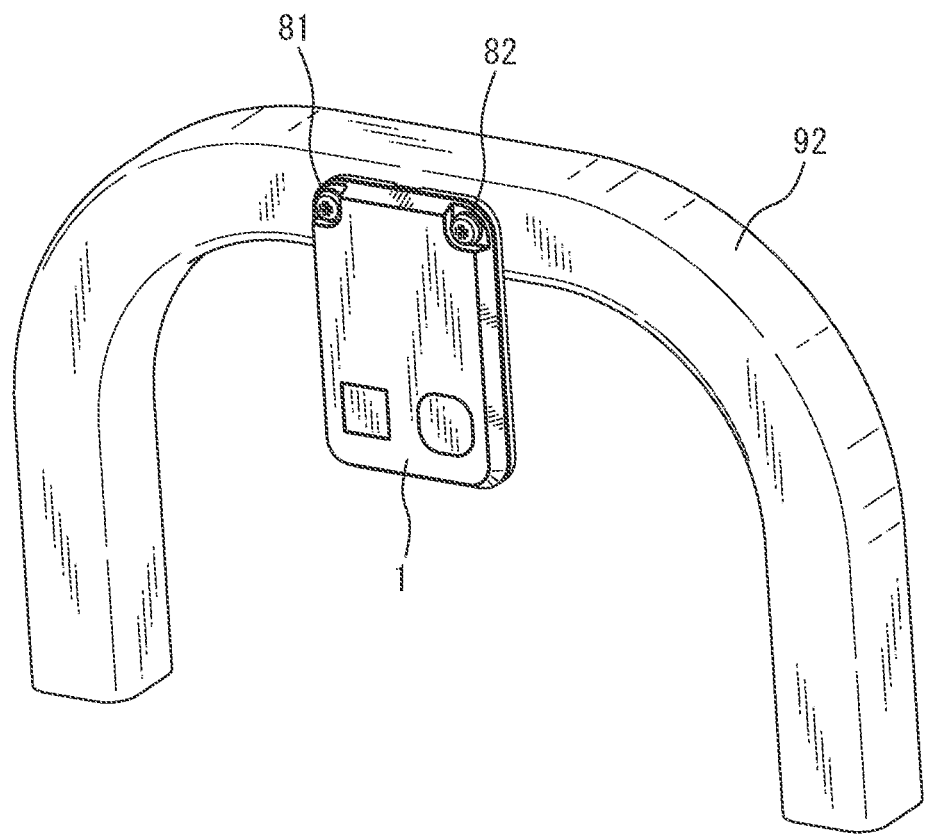
FIG. 13 is a view showing an example (application example) of housing attachment.

FIG. 13 shows an example of attachment (usage example) of the housing 1. As shown in FIG. 13, the housing 1 can also be used by affixing it to an affixation member 92 with screws 81, 82 via screw holes 1c, 1d (refer to FIGS. 1A and 1B) of the housing 1. In this case, for example, the electronic device mounted inside the housing 1 may be an electronic device having a sensor that measures the environmental conditions where the housing 1 is installed and wirelessly communicates the measurement results.

Figure 14:
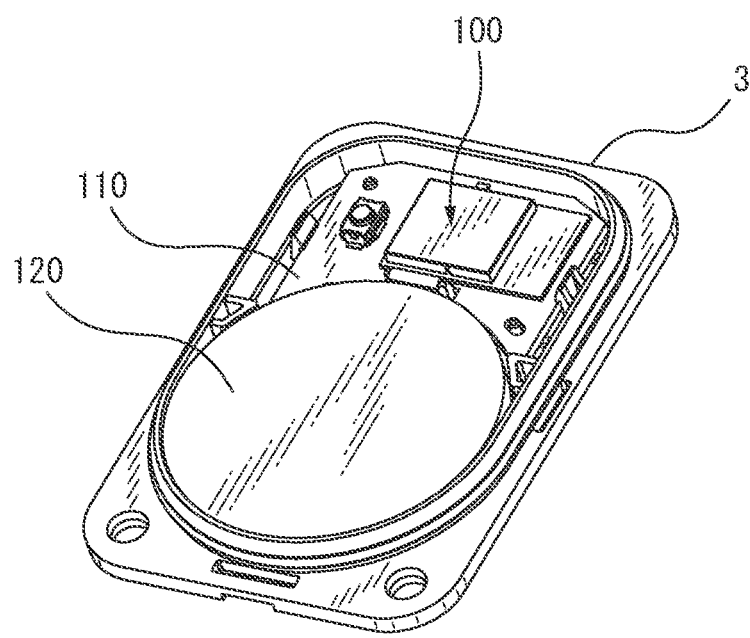
FIG. 14 is a perspective view showing a state in which an electronic device is incorporated in a lower case.

The mounting structure of the electronic device 100 mounted in the interior space 1a of the housing 1 will be described below. FIG. 14 is a perspective view showing a state in which the electronic device 100 is incorporated in the lower case 3. As shown in FIG. 14, the electronic device 100 comprises a printed circuit board 110 on which components are mounted, and a button battery (hereinafter referred to simply as "battery") 120.

Figure 15:
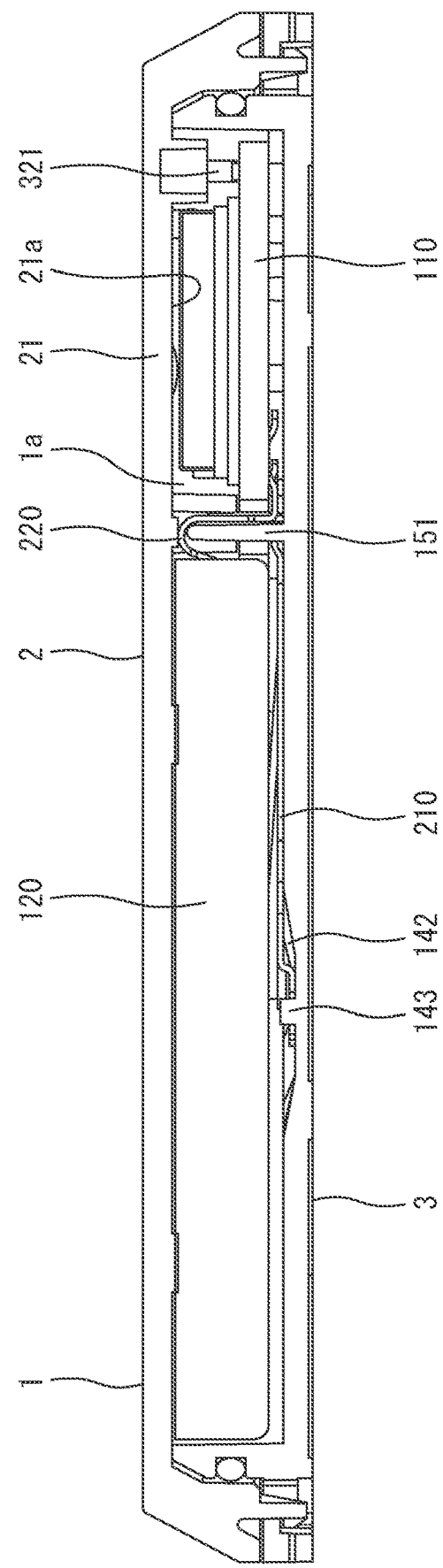
FIG. 15 is a cross-sectional view of a housing in a state in which an electronic device is mounted in an interior space.
Figure 16:
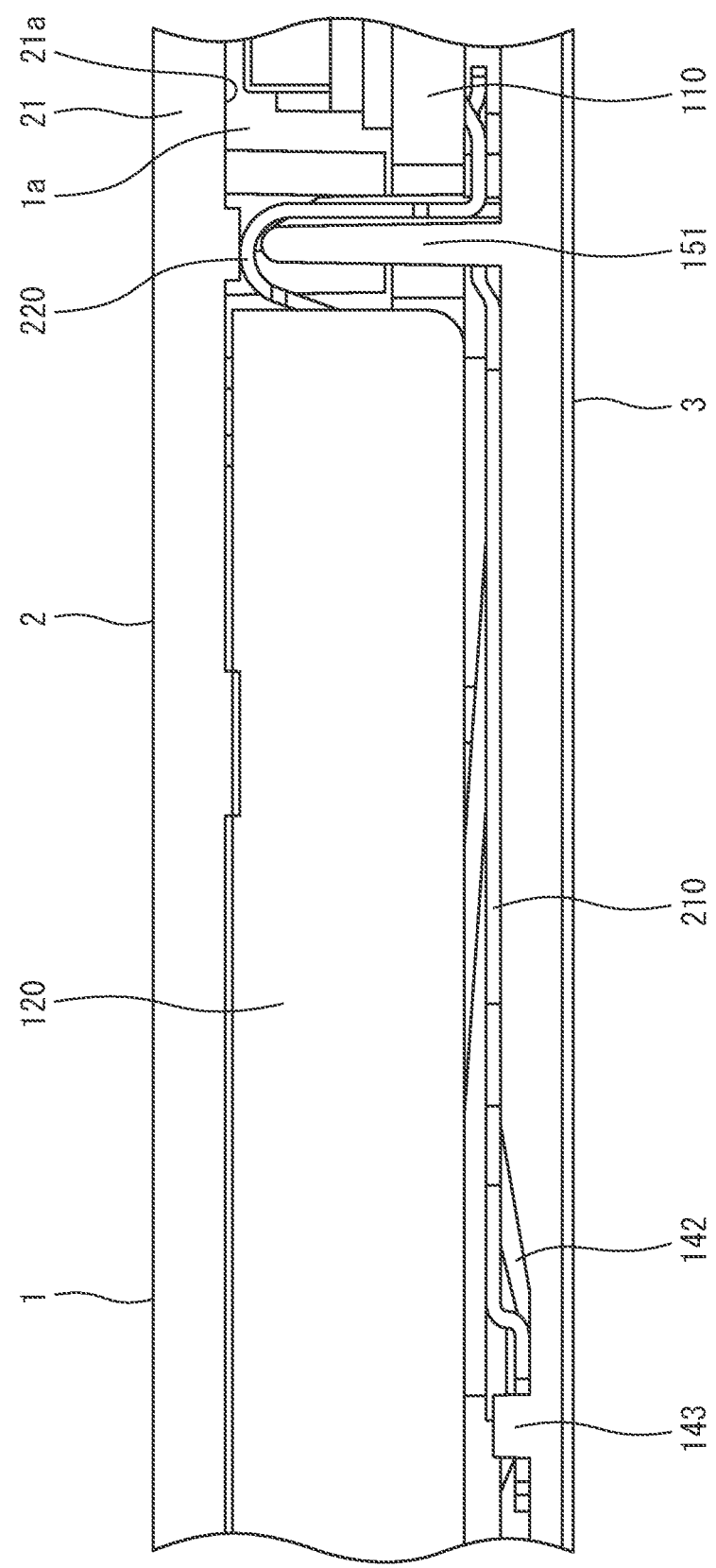
FIG. 16 is an enlarged view of a central portion of the cross-sectional view of FIG. 15.
Figure 17:
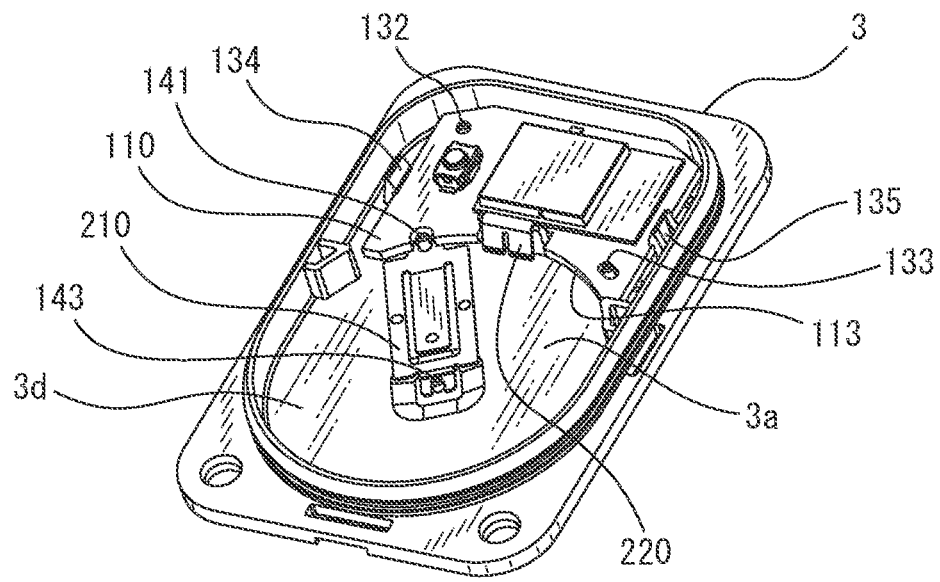
FIG. 17 is a view showing a state in which a battery is removed from the state shown in FIG. 14.

FIG. 15 shows a cross-sectional view of the housing 1 in a state in which the electronic device 100 is mounted in the interior space thereof (this cross-sectional view corresponds to a cross-sectional view as viewed from the direction opposite to the arrow X1-X1 direction of FIG. 1). FIG. 16 shows an enlarged view of the central portion of the cross-sectional view of FIG. 15. As shown in FIGS. 15 and 16, in the interior space 1a of the housing 1, the printed circuit board 110 and the battery 120 are arranged in positions which are shifted relative to each other in the horizontal direction so that they do not overlap in the upward-downward directions (i.e., in the directions in which the upper case 2 mates with the lower case 3). FIG. 17 shows a state in which the battery 120 is removed from the state shown in FIG. 14.

As shown in FIGS. 15 to 17, the battery 120 is configured such that a bottom electrode of the battery 120 is electrically connected to the printed circuit board 110 by a first terminal member 210 and a side electrode of the battery 120 is electrically connected to the printed circuit board 110 by a second terminal member 220.

The structure of the inner bottom surface 3a of the lower case 3 will be described with reference to FIG. 3A. As shown in FIG. 3A, a total of six supporting protrusions 131 for supporting the printed circuit board 110, two positioning pins 132, 133 for positioning the printed circuit board 110, and two pressing portions 134, 135 which press the printed circuit board 110 from opposite directions are formed on the inner bottom surface 3a. Note that the positioning pins 132, 133 and the pressing portions 134, 135 are also shown in FIG. 17.

A positioning pin 141 for positioning one end of the first terminal member 210, and a recess 142, which is formed so as to be recessed from the inner bottom surface, for accommodating the other end of the first terminal member 210 are also formed on the inner bottom surface 3a. A positioning pin 143 for positioning the other end of the first terminal member 210 is formed in the recess 142. The positioning pin 141 is formed in a position so as to be accommodated in a notch 114 (refer to FIG. 18) formed in the rim portion of the printed circuit board 110 in a state in which the printed circuit board 110 is attached to the inner bottom surface 3a. A support protrusion 151 for supporting the second terminal member 220 is further formed on the inner bottom surface 3a. Note that the positioning pins 141, 143 are also shown in FIG. 17.

Figure 18:
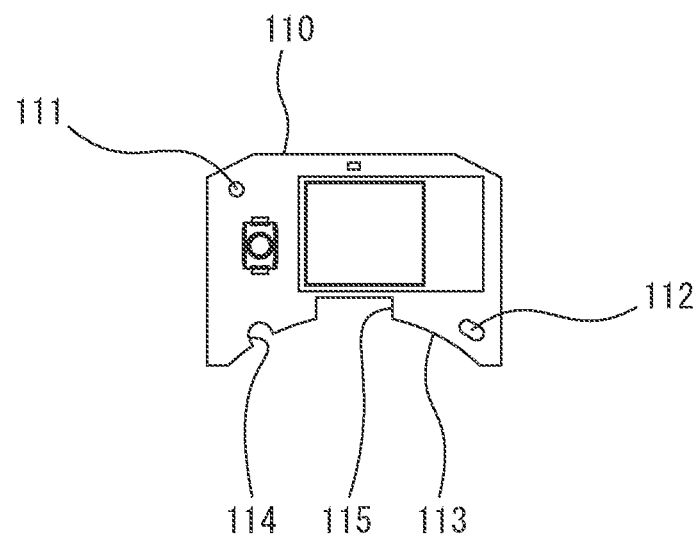
FIG. 18 is a plan view of a printed circuit board.

FIG. 18 shows a plan view of the printed circuit board 110 alone. As shown in FIG. 18, the printed circuit board 110 has a substantially rectangular shape, and among the four sides defining the outer shape of the substantially rectangular shape, the side 113 on which the battery 120 is mounted is formed in an arc-like shape along the outer shape of the battery 120. A semi-circular notch 114 formed in the arc-shaped side 113 accommodates therein the positioning pin 141 for the first terminal member 210 in a state in which the printed circuit board 110 is mounted on the inner bottom surface 3a as described above. A rectangular notch 115 formed in the arc-shaped side 113 accommodates the support protrusion 151 for the second terminal member 220 in a state in which the printed circuit board 110 is mounted on the inner bottom surface 3a as described above. Two holes 111, 112 through which the positioning pins 132, 133 pass are further formed in the printed circuit board 110. The printed circuit board 110 is horizontally positioned by the positioning pins 132, 133 and the two pressing portions 134, 135.

Figure 22:
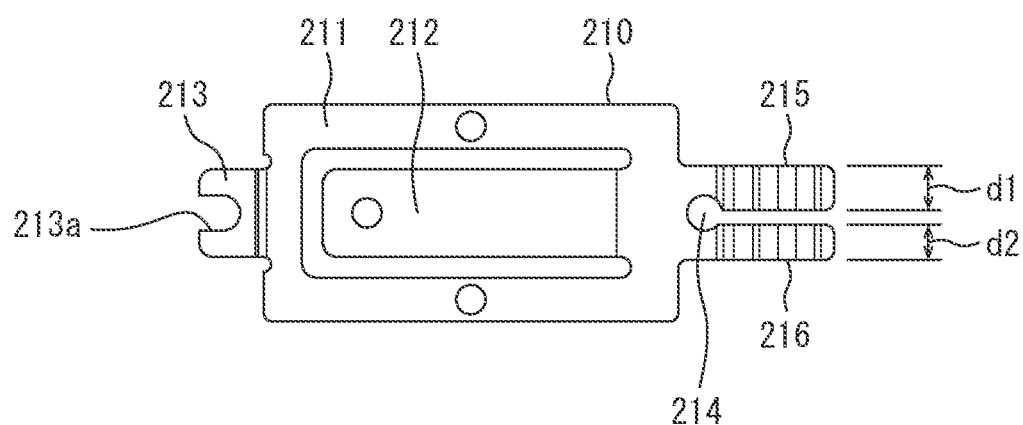
FIG. 22 is a plan view of a first terminal member.
Figure 23:
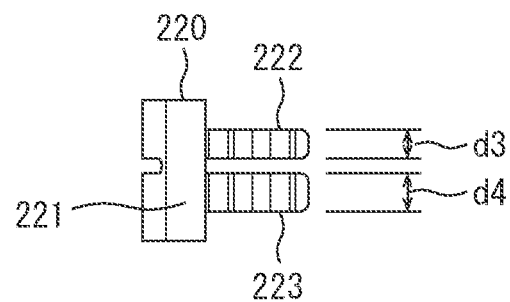
FIG. 23 is a plan view of a second terminal member.

Next, connection of the first terminal member 210 and the second terminal member 220 to the printed circuit board 110 will be described with reference to FIGS. 19 to 21. FIGS. 22 and 23 show plan views of the first terminal member 210 and the second terminal member 220, respectively.

For convenience of explanation, the end of a base 211 of the first terminal member 210 on which contact spring portions 215, 216 are provided is defined as the proximal end, and the end on which a protrusion 213 is provided is defined as the distal end, and the central portion between the ends will be referred to as the central portion (refer to FIG. 22). As shown in detail in FIGS. 19 and 22, the first terminal member 210 comprises a rectangular frame-shaped base 211 and a leaf spring portion 212 formed so as to extend from the proximal end side of the base 211 to the central portion space of the base 211. Two arm-like contact spring portions 215, 216 connected to the printed circuit board 110 are provided on the proximal end side of the base 211. A substantially circular notch 214 is formed at the base portion between the two contact spring portions 215, 216 to engage the positioning pin 141. The protrusion 213 arranged in the recess 142 is formed on the distal end side of the base 211, and a substantially circular notch 213a which engages with the positioning pin 143 in the recess 142 is formed on the distal end side of the protrusion 213.

Figure 19:
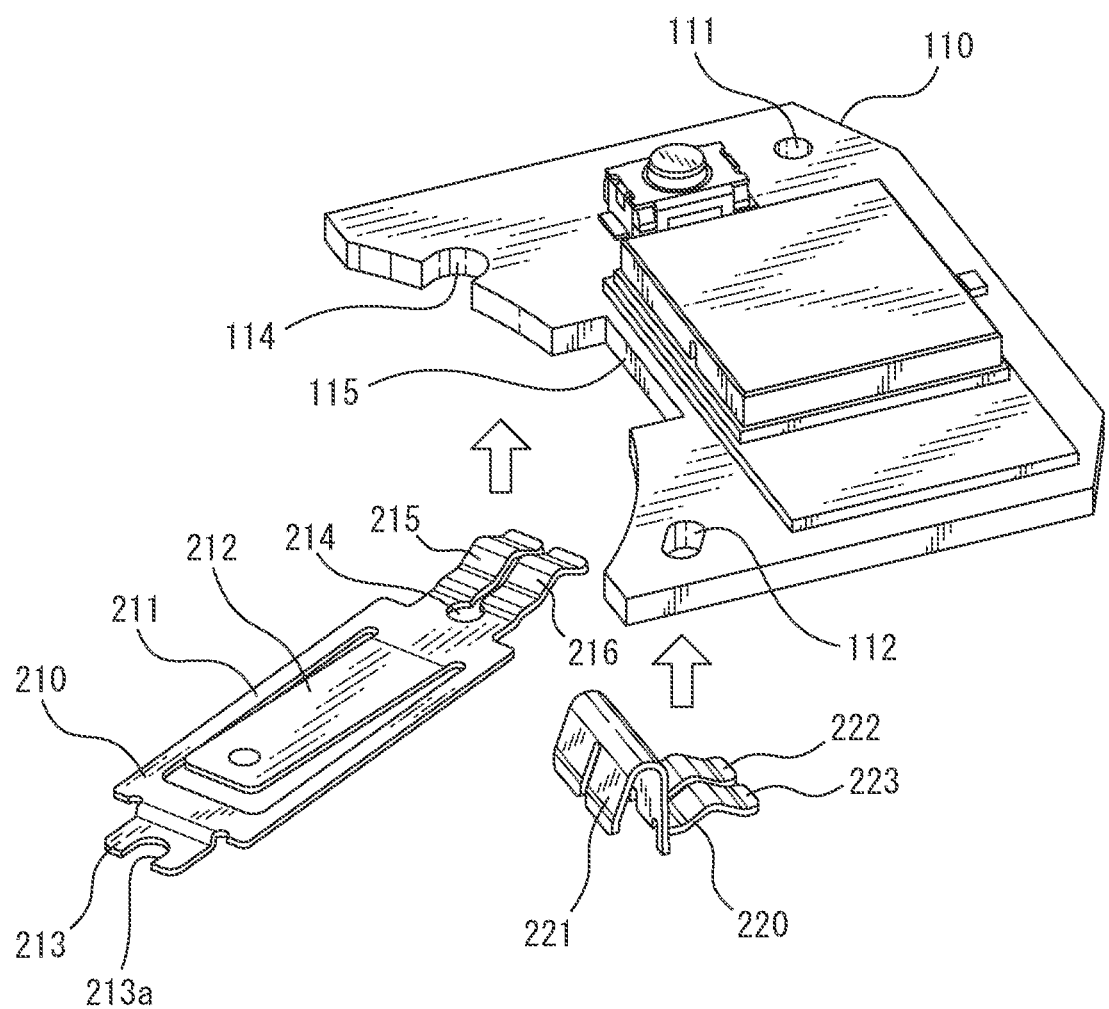
FIG. 19 is a view detailing connection between a printed circuit board and first and second terminal members.

As shown in detail in FIGS. 19 and 23, the second terminal member 220 has a curved base 221 supported by the support protrusion 151, and two contact spring portions 222, 223 formed so as to extend from one end of the base 221. The second terminal member 220 can be stably arranged on the inner bottom surface 3a by placing the base 221 on the support protrusion 151.

Figure 20:
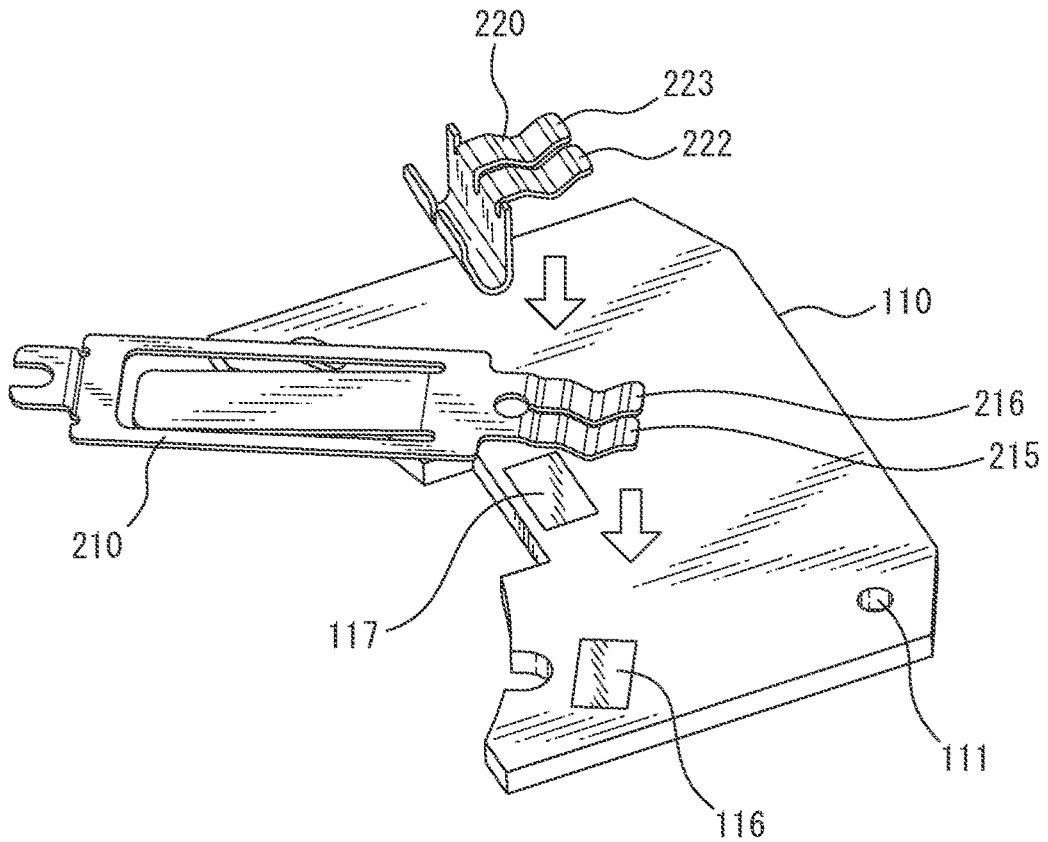
FIG. 20 is a view detailing connection between a printed circuit board and first and second terminal members.

FIG. 20 shows a view of the mounting state shown in FIG. 19 as viewed from below. As shown in FIG. 20, a pad 116 for contacting the contact spring portions 215, 216 of the first terminal member 210 and a pad 117 for contacting the contact spring portions 222, 223 of the second terminal member 220 are provided on the bottom side of the printed circuit board 110. The pad 116 is arranged in a position contacting the contact spring portions 215, 216 when the first terminal member 210 is arranged at a predetermined position on the inner bottom surface 3a and the printed circuit board 110 is mounted at a predetermined position on the inner bottom surface 3a from above. The pad 117 is arranged at a position contacting the contact spring portions 222, 223 when the second terminal member 220 is arranged at a predetermined position on the inner bottom surface 3a and the printed circuit board 110 is mounted at a predetermined position on the inner bottom surface 3a from above.

When the electronic device 100 is assembled on the inner bottom surface 3a, the first terminal member 210 is arranged on the bottom surface so that the protrusion 213 is positioned in the recess 142, the notch 213a is engaged with the positioning pin 143, and the notch 214 on the proximal end side is engaged with the positioning pin 141 on the bottom surface. Next, the second terminal member 220 is placed on the inner bottom surface 3a so that the base 221 hangs on the support protrusion 151. The printed circuit board 110 is then placed on the inner bottom surface 3a from above (refer to FIG. 17).

Figure 21:
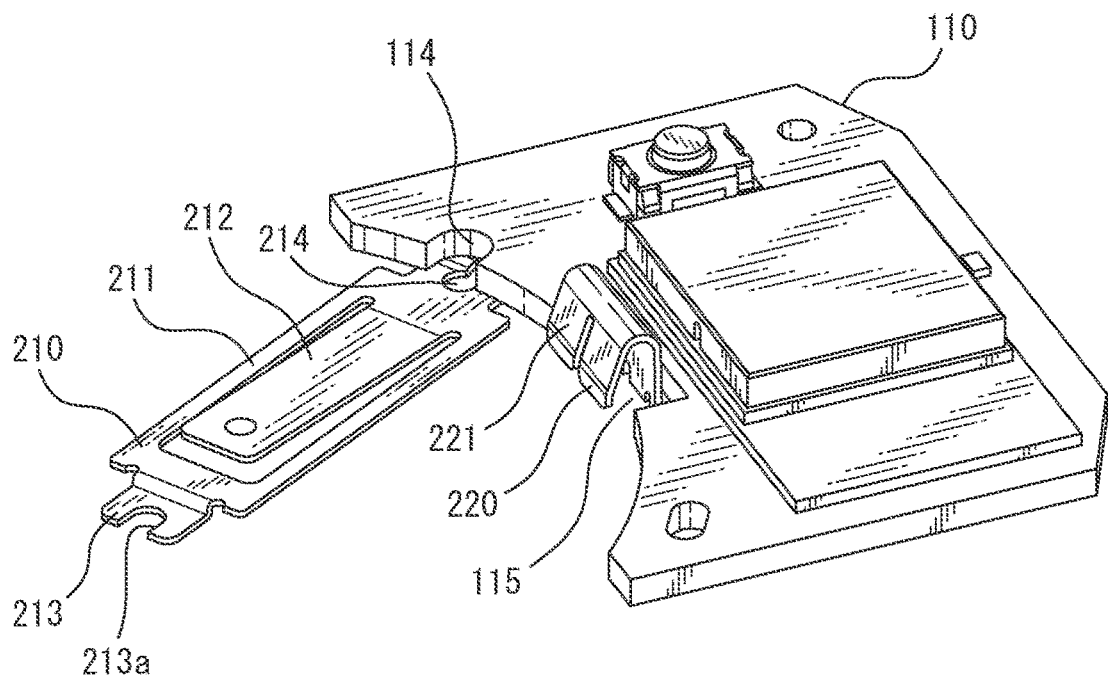
FIG. 21 is a view detailing connection between a printed circuit board and first and second terminal members.

As a result, the printed circuit board 110, the first terminal member 210, and the second terminal member 220 are assembled on the inner bottom surface as shown in FIG. 21. In the attachment state as shown in FIGS. 17 and 21, the contact spring portions 215, 216 of the first terminal member 210 contact the pad 116 on the bottom side of the printed circuit board 110, and the contact spring portions 222, 223 of the second terminal member 220 contact the pad 117 on the bottom side of the printed circuit board 110 (refer to FIG. 20). From this state, the battery 120 is arranged so as to be fitted from above into an arrangement space 3d defined by the arc-shaped side 113 of the printed circuit board 110 and the arc-shaped inner peripheral surface portion of the lower peripheral wall 32 (refer to FIGS. 14 and 17). From this state, the upper case 2 is further attached to the lower case 3 and affixed. In this state, the battery 120 is held downward by the inner surface 21a of the upper plate portion 21 of the upper case 2, and the printed circuit board 110 is also pressed downward by the inner surface 21a of the upper plate portion 21 (pressing projection 321 formed on the inner surface 21a, etc.). In this state, the contact between the contact spring portions 215, 216 of the first terminal member 210 and the pad 116, the contact between the leaf spring portion 212 of the first terminal member 210 and the bottom electrode of the battery 120, the contact between the contact spring portions 222, 223 of the second terminal member 220 and the pad 117, and the contact between the base 221 of the second terminal member 220 and the side electrode of the battery 120 are maintained in a stable state (refer to FIGS. 5B, 15 and 16).

As described above, in the present embodiment, the printed circuit board 110 and the battery 120 are separated in the interior space 1a of the housing 1, and the first terminal member 210 and the second terminal member 220 are electrically connected to the printed circuit board 110 in a contact manner. Solder attachment is not required in this configuration. As a result, as can be understood from FIGS. 15 and 16, the vertical size of the interior space 1a of the housing 1 can be reduced to a value equal (or substantially equal) to the sum of the thickness of the battery 120 and the plate thickness of the first terminal member 210. Specifically, the thickness of the housing 1 is reduced to the thickness of the upper plate portion 21 of the upper case 2, the thickness of the battery 120, the plate thickness of the first terminal member 210, and the thickness of the bottom plate of the lower case 3.

As described above, in the present embodiment, the connection between the first terminal member 210 and the second terminal member 220 and the printed circuit board 110 has a spring contact structure which does not require soldering. As a result, electrical connection of the first terminal member 210 and the second terminal member 220 with the printed circuit board 110 can be achieved even if production by solder reflow is not possible.

In the present embodiment, the electrical connection of the first terminal member 210 and the second terminal member 220 with the printed circuit board 110 is of a contact type. Thus, it is preferable to use a configuration which prevents instantaneous disconnection of the electrical connection between the first terminal member 210 and the pad 116 and between the second terminal member 220 and the pad 117.

First, each of the first terminal member 210 and the second terminal member 220 is configured for multi-point connection with the printed circuit board 110. Specifically, as shown in FIG. 22, the first terminal member 210 is configured to connect with the pad 116 by the two curved arm-shaped contact spring portions 215, 216. The second terminal member 220 is configured to connect with the pad 117 by the two curved arm-shaped contact spring portions 222, 223. As a result, the occurrence of momentary interruptions can be reduced as compared to a configuration in which a single contact is used for connection. As an example, a configuration example in which the number of connection contacts between the terminal and the pad is two is shown, but a larger number of connection contacts may be used.

Second, as shown in FIG. 22, for the first terminal member 210, by setting the widths d1, d2 of the two contact spring portions 215, 216 to different sizes, the mechanical resonance frequencies of the two contact spring portions 215, 216 are differentiated. As a result, the two contact spring portions 215, 216 vibrate at different vibration frequencies, thereby preventing both of the two contact spring portions 215, 216 from separating from the pad at the same time. As shown in FIG. 23, for the second terminal member 220 as well, by likewise setting the widths d3, d4 of the two contact spring portions 222, 223 to different sizes, the mechanical resonance frequencies of the two contact spring portions 222, 223 become different. As a result, the two contact spring portions 222, 223 vibrate at different vibration frequencies, thereby preventing both of the two contact spring portions 222. 223 from separating from the pad at the same time.

Though an example of setting different mechanical resonance frequencies by making the widths of the two contact spring portions different has been described, other configurations for making the mechanical resonance frequencies different (for example, making the contact spring portions different in length) may be adopted.

For example, though a configuration example in which the gasket P is arranged on the outer peripheral surface of the lower peripheral wall 32 is described in the above embodiment, the gasket P can also be arranged at other positions for sealing the gap between the upper case 2 and the lower case 3.

Though a configuration example in which a cantilever with a hook is provided in the upper case, and an engagement hole for engaging the hook is provided in the lower case is described in the above embodiment, a configuration in which a cantilever having a hook is provided in the lower case and an engagement hole for engaging the hook is provided in the upper case may also be adopted.

All examples and conditional language provided herein are intended for the purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A housing for housing an electronic device, the housing comprising:
    an upper case and a lower case which are formed so as to mate with each other,
    a gasket arranged between the upper case and the lower case,
    an elastically deformable cantilever which is formed on one of the upper case and the lower case and which has a hook, and
    an engagement portion formed on the other of the upper case and the lower case,
    wherein the upper case and the lower case each have a peripheral wall,
    wherein the gasket is arranged between the peripheral walls of the upper case and the lower case,
    wherein the cantilever is formed so as to protrude from a distal end of the peripheral wall of the one of the upper case and the lower case,
    wherein when an operation to mate the upper case and the lower case is performed, before the cantilever is completely engaged with the engagement portion, a gap between the upper case and the lower case is sealed by the gasket.

2. The housing according to claim 1,
    wherein the engagement portion is formed as an engagement hole in a rim portion positioned further outside of the peripheral wall of the other of the upper case and the lower case.

3. The housing according to claim 2,
    wherein the cantilever is formed in a position closer to an inner space than an outermost peripheral surface of the peripheral wall of the one of the upper case and the lower case, and
    in a state in which the upper case and the lower case are mated with each other, the cantilever is hidden by the one of the upper case and the lower case.

4. The housing according to claim 3,
    wherein a notch for pressing the cantilever to disengage the hook from the engagement portion in a state in which the upper case and the lower case are mated is formed in the rim portion of the other of the upper case and the lower case.

5. A housing for housing an electronic device, the housing comprising:
- an upper case and a lower case which are formed so as to mate with each other,
- a gasket arranged between the upper case and the lower case,
- an elastically deformable cantilever which is formed on one of the upper case and the lower case and which has a hook, and
- an engagement portion formed on the other of the upper case and the lower case,
- wherein when an operation to mate the upper case and the lower case is performed, before the cantilever is completely engaged with the engagement portion, a gap between the upper case and the lower case is sealed by the gasket, wherein:
- the upper case and the lower case each have a peripheral wall,
- the gasket is arranged between the peripheral walls of the upper case and the lower case,
- the cantilever is formed so as to protrude from a distal end of the peripheral wall of the upper case, and
- wherein the engagement portion is formed as an engagement hole in a rim portion positioned further outside of the peripheral wall of the lower case.

6. The housing according to claim 5,
- wherein the cantilever is formed in a position closer to an inner space than an outermost peripheral surface of the peripheral wall of the upper case, and
- in a state in which the upper case and the lower case are mated with each other, the cantilever is hidden by the upper case.

7. The housing according to claim 6,
- wherein a notch for pressing the cantilever to disengage the hook from the engagement portion in a state in which the upper case and the lower case are mated is formed in the rim portion of the lower case.

* * * * *